United States Patent
Bergman et al.

(10) Patent No.: US 7,663,492 B2
(45) Date of Patent: Feb. 16, 2010

(54) METHOD AND MEANS FOR CONTROLLING THE OPERATION OF A MACHINE BASED UPON THE WEARING OF A SENSOR BY A MACHINE OPERATOR

(75) Inventors: Matthew A. Bergman, Des Moines, IA (US); R. Thomas Seaberg, Des Moines, IA (US); Liansuo Xie, Ankeny, IA (US)

(73) Assignee: Stork Townsend Inc., Des Moines, IA (US)

( * ) Notice: Subject to any disclaimer, the term of this patent is extended or adjusted under 35 U.S.C. 154(b) by 423 days.

(21) Appl. No.: 11/538,177

(22) Filed: Oct. 3, 2006

(65) Prior Publication Data

US 2008/0079590 A1 Apr. 3, 2008

(51) Int. Cl.
*G08B 23/00* (2006.01)
*G08B 13/18* (2006.01)
*G08B 21/00* (2006.01)
*H01H 47/12* (2006.01)

(52) U.S. Cl. ............... 340/573.1; 340/686.1; 340/552; 340/561; 340/566; 340/567; 361/179; 361/180; 361/81

(58) Field of Classification Search ........................ None
See application file for complete search history.

(56) References Cited

U.S. PATENT DOCUMENTS

| 3,953,770 | A | * | 4/1976 | Hayashi | 361/179 |
|---|---|---|---|---|---|
| 4,945,305 | A | | 7/1990 | Blood | |
| 5,563,581 | A | | 10/1996 | Kats | |
| 6,418,004 | B1 | * | 7/2002 | Mather et al. | 361/179 |
| 6,853,531 | B2 | * | 2/2005 | Mather et al. | 361/179 |
| 6,856,852 | B1 | | 2/2005 | Bruinsma et al. | |
| 7,365,955 | B2 | * | 4/2008 | Mather et al. | 361/179 |
| 2002/0082803 | A1 | | 6/2002 | Schiffbauer | |
| 2002/0171993 | A1 | * | 11/2002 | Mather et al. | 361/179 |
| 2004/0081930 | A1 | * | 4/2004 | Bachinski et al. | 431/125 |
| 2007/0132581 | A1 | * | 6/2007 | Molyneaux et al. | 340/551 |

FOREIGN PATENT DOCUMENTS

| DE | 19829019 | 1/2000 |
|---|---|---|
| EP | 1233231 | 8/2002 |
| WO | 8606816 | 11/1986 |

\* cited by examiner

*Primary Examiner*—Julie Lieu

(57) ABSTRACT

A method and means for controlling the operation of a machine by an operator having a transmitter mounted to a machine, a sensor attached to an operator or an operator's clothing, and a tracking device that receives signals from the sensor and determines the position of the sensor. Based on the determined position of the sensor, the tracking device sends signals to the operator and an actuator on the machine based on a comparison with a danger zone, warning zone, or operator zone.

14 Claims, 4 Drawing Sheets

METHOD AND MEANS FOR CONTROLLING THE OPERATION OF A MACHINE BASED UPON THE WEARING OF A SENSOR BY A MACHINE OPERATOR

BACKGROUND OF THE INVENTION

Injuries resulting from the operation of machinery are well known and include injuries to body parts that become caught in machinery. Sometimes, articles of clothing become caught in operating machinery that also leads to injuries.

Prior art discloses several types of mechanisms that attempt to prevent or minimize the possibility of operators being injured when working with machines. These devices include the use of mechanisms, special mats, shoes, gloves, or other equipment that are cumbersome, expensive, or unreliable. Further, some of these devices are programmed to stop only after an operator makes contact with a danger point. These safety devices give a false sense of security to the operator and can add additional hazards to the machine. Therefore, it is desired to have a device that improves upon these deficiencies in the art.

An object of the present invention is to provide a system that ensures that a machine will not operate when an individual enters a danger zone.

Another object of the present invention is to provide a system that detects when an operator is near a danger zone.

Another object of the present invention if to provide a system that has a control system that will gradually shut down as an operator nears the danger zone.

These and other objectives, features, and enhancements will be shown by the following description.

SUMMARY OF THE INVENTION

A method and means for controlling the operation of a machine by an operator having a transmitter mounted to a machine, a sensor attached to an operator or an operator's clothing, and a tracking device that receives signals from the sensor and determines the position of the sensor. Based on the determined position of the sensor, the tracking device sends signals to the operator and an actuator on the machine based on a comparison with a danger zone, warning zone, or operator zone.

DETAILED DESCRIPTION OF THE PREFERRED EMBODIMENT

The invention may be used with any type of equipment including, but not limited to, meat processing equipment, grain handling equipment, farm implements, conveyors, and manufacturing equipment. For purposes of example only, the invention will be described in relation to a skinning machine for removing the skin and fat from meat products.

Figure 1:
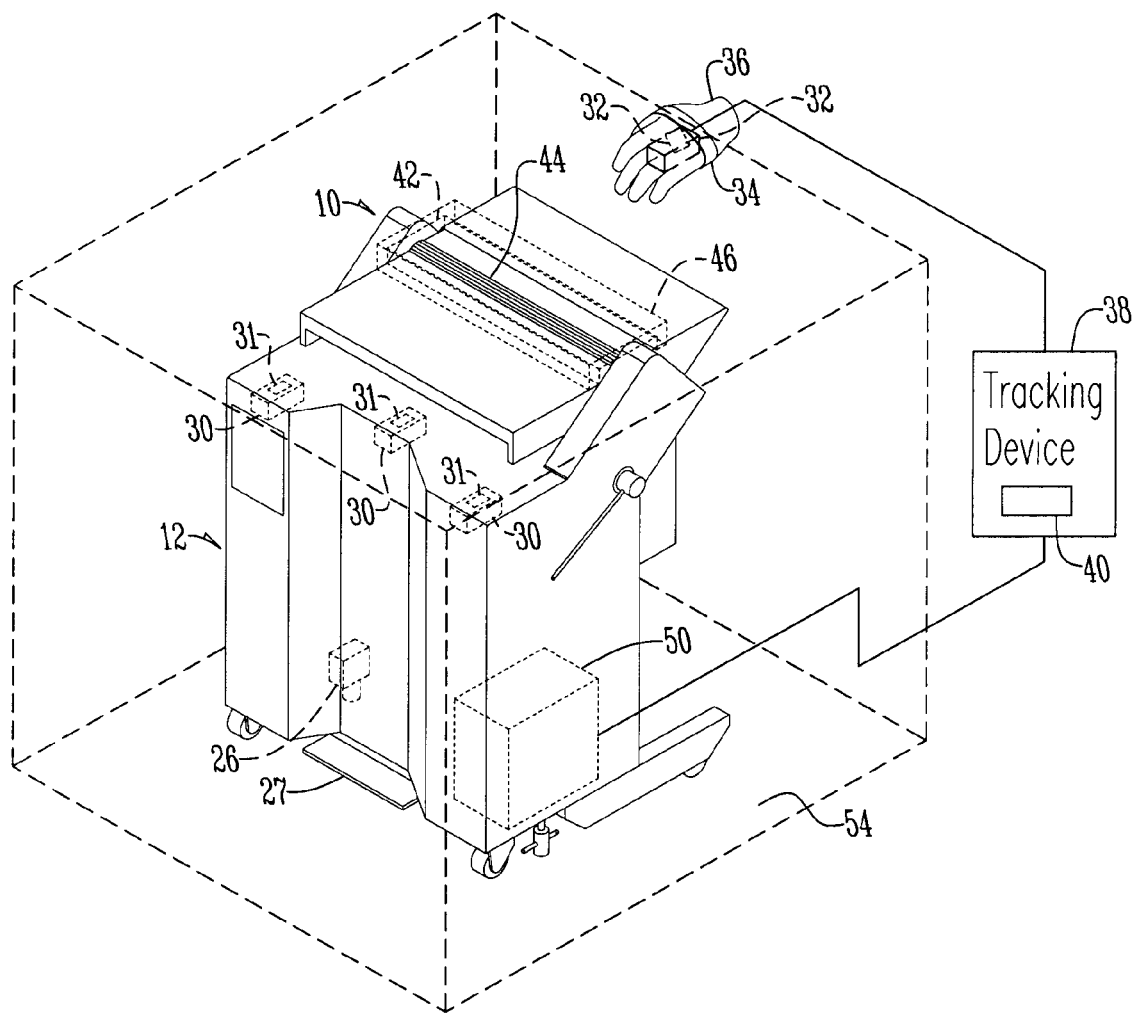
FIG. 1 is a perspective view of a skinning machine.
Figure 2:
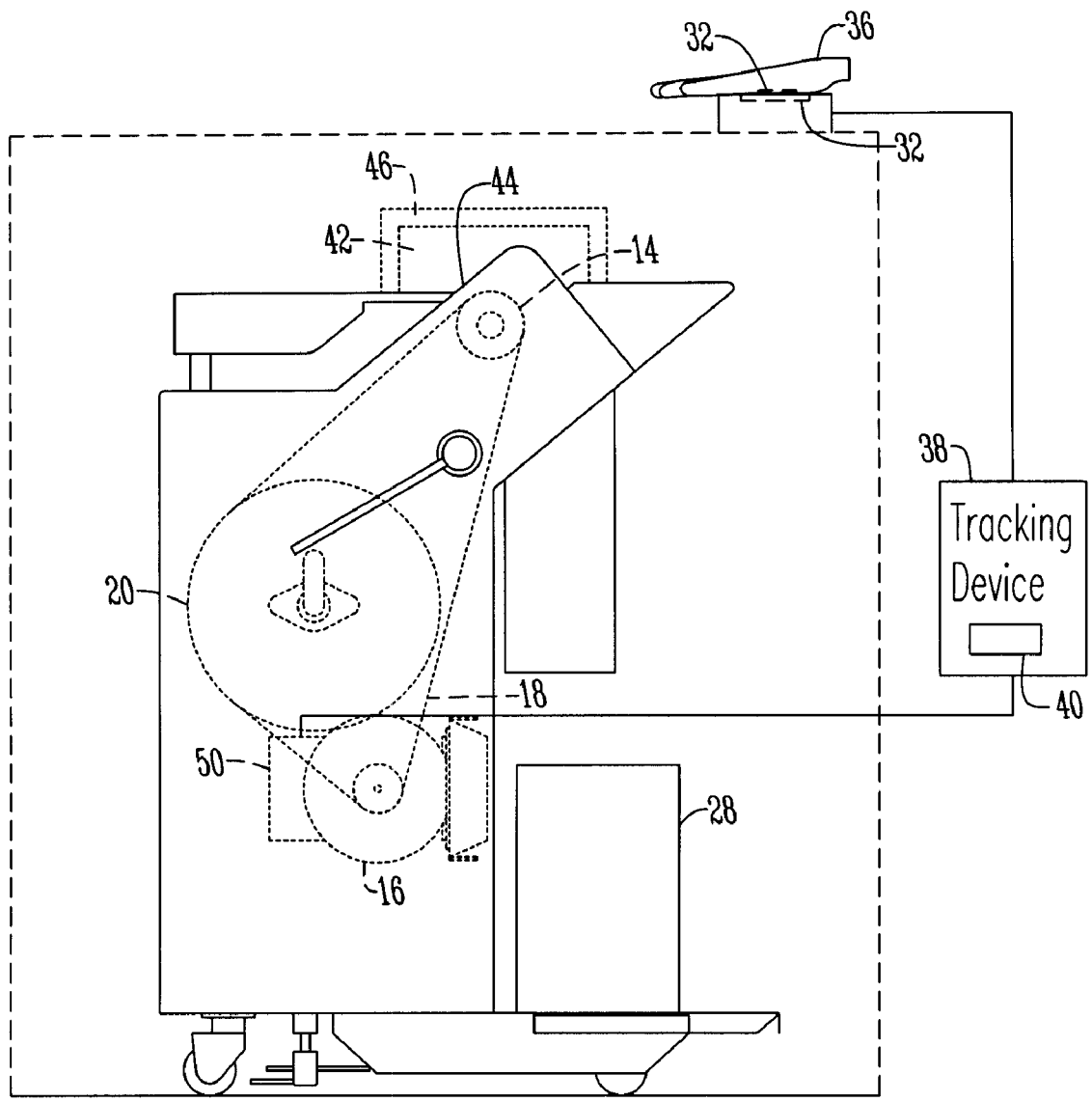
FIG. 2 is a side view of a skinning machine.
Figure 3:
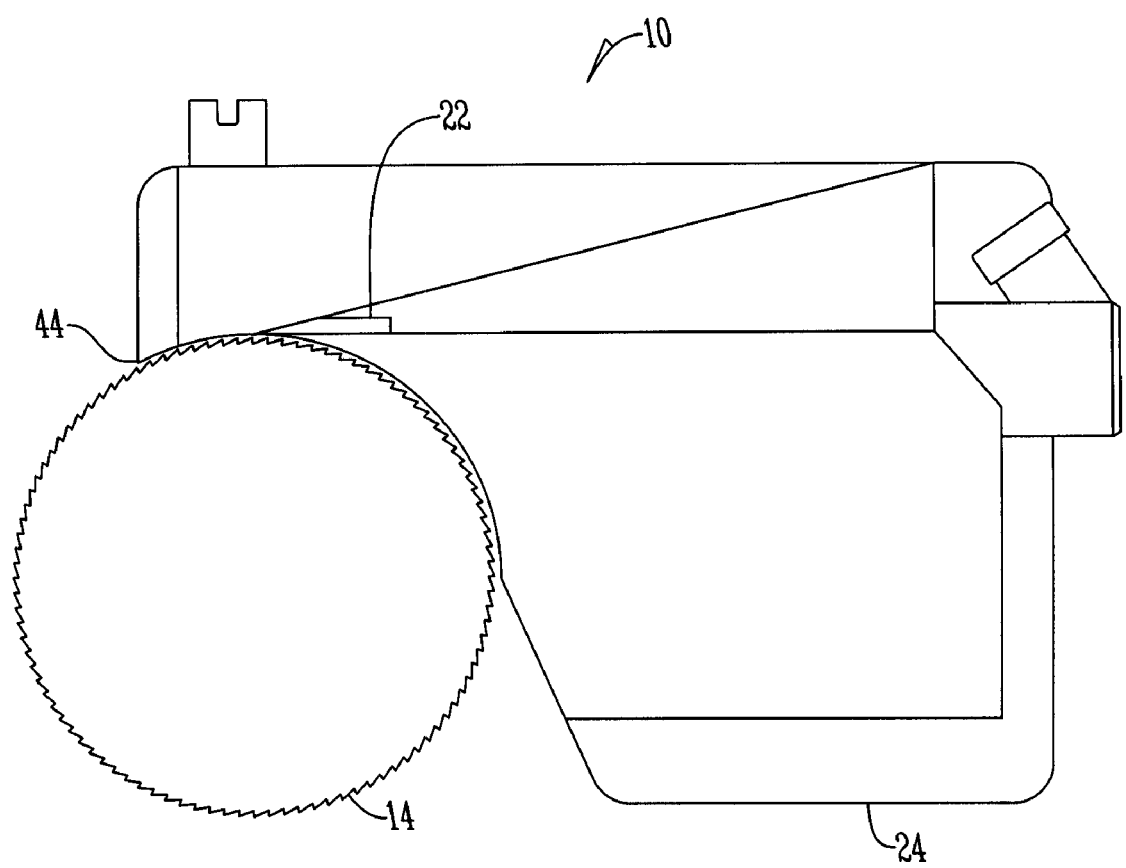
FIG. 3 is a side view of a toothroll, shoe, and blade of a skinning machine.
Figure 4:
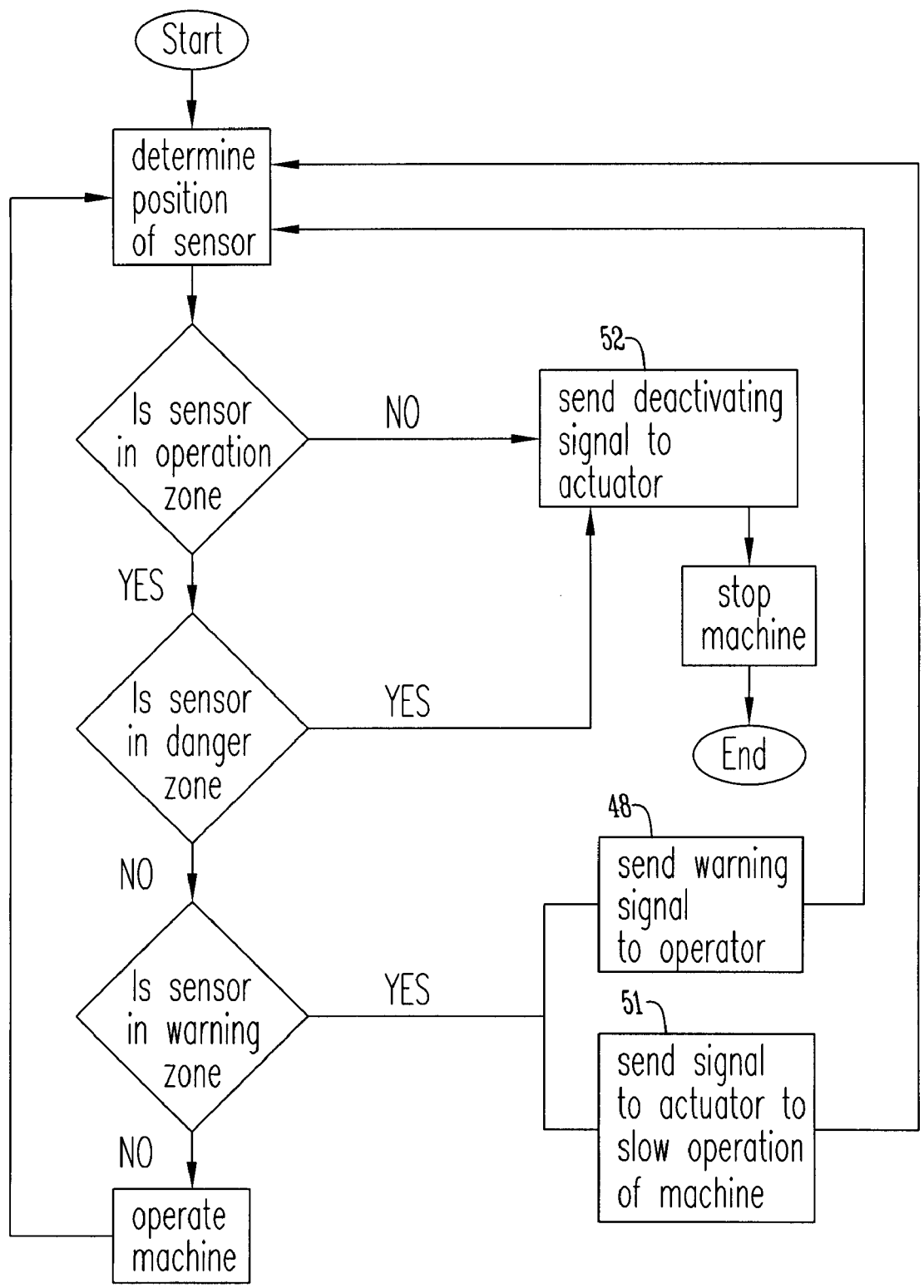
FIG. 4 is a flow chart diagram of a method for controlling the operation of a machine.

FIGS. 1-3 show a skinning machine 10 that has a frame 12 and a toothroll 14 that is rotated via a power mechanism that includes a power mechanism or motor 16 by drive system 18 using pulley 20. Parallel to the top of the toothroll 14 is cutting blade 22 that is mounted onto shoe 24. The machine also has a foot switch 26 operated by foot pedal 27 that controls the toothroll 14. The material removed by the skinning process on machine 10 is deposited into collection container 28.

Mounted to the frame 12 is at least one transmitter 30. The transmitter 30 establishes a reference point 31. While any type of transmitter 30 may be used, preferred is a transmitter that generates a DC magnetic field that is picked up by at least one receiver/sensor 32. While any type of sensor 32 may be used, preferred is a sensor 32 that will measure the fields generated by transmitter 30 but also the earth's magnetic field to thereby effect an ultimate measure of the position and the orientation of the object to which it is attached. An example of one such sensor is disclosed in U.S. Pat. No. 4,945,305 by Blood, incorporated herein by reference in its entirety. One skilled in the art will also appreciate that other sensors 32 include a barcode, a piece of metal, a radio frequency receiver, an electronic tag, a color or shape or any other suitable sensor device.

The sensor 32 is attached to an operator in any conventional manner such as by a strap 34, adhesive or the like. Alternatively, the sensor 32 is attached to an article of clothing 36, such as a glove, boot, or shirt in any conventional manner. Preferred is a sensor 32 that is removably attached to an article of clothing 36 so that the clothing 36 may be laundered or sensors 32 for different machines may be exchanged.

The sensor 32 is connected to a tracking device 38 by either an electrical cable or a wireless connection. The tracking device 38 has a processor 40 that receives information from the sensors 32. Initially, a danger zone 42 is programmed into the processor 40. The danger zone 42 can be calibrated, for example, by having an operator touch the danger contact point 44. In this manner, the system could be programmed to accommodate operators of different size or variation in the machine. Alternatively, the danger zone 42, is manually inputted into the processor. The danger zone 42 is determined by the time it would take for the machine to come to a stop when operating at full speed as compared to the time it would take an operator to reach the contact point 44 after entering the danger zone 42. In addition, one or more warning zones 46 are established within the processor either through calibration, manual input, or calculations based on the size of the danger zone 42.

The processor 40 receives information from the sensor 32, and based on this information determines the position of the sensor 32. Once the position of the sensor 32 is determined, the processor 40 compares the determined position of the sensor 32, with the known warning 46 and danger 42 zones. If the determined position is within a warning zone 46 a warning signal 48 is provided to the operator. The warning signal 48 is of any type including audio, light, vibration, or shock. The intensity of the signal 48 may increase as an operator moves closer to the danger zone 42. In addition, in one preferred embodiment, a signal 51 is sent to an actuator 50 on the machine 10 that slows the operation of the machine based upon entry into a warning zone 46. The actuator 50 is of any type connected to the drive system of the machine such as an operating controller, a clutch or other type of friction system, a ratch and claw system, or the like.

If the processor 40 determines that the sensor 32 is within the danger zone 42, it will send a deactivating signal 52 to the actuator 50 which in turn stops the operation of the machine prior to the operator engaging the danger contact point 44. In addition, if the processor determines that a sensor 32 is outside of the zone of operation 54, a deactivating signal 52 is sent to the actuator 50 to stop the machine 10.

A method and means for controlling the operation of a machine based on the wearing of a sensor has been shown that, at the very least, meets all the stated objectives.

What is claimed:

1. A system for controlling the operation of a machine by an operator, comprising:
   at least one transmitter mounted to a machine that creates a reference point;
   at least one sensor adapted to be attached to an operator and is connected to a tracking device;
   the tracking device having a processor that receives a signal from the sensor, determines the position of the sensor, and compares the determined position of the sensor with a predetermined danger zone; and
   the processor operable to send a deactivating signal when the determined position is within the danger zone.

2. The system of claim 1 wherein the processor compares the determined position of the sensor with a predetermined warning zone and is operable to send a warning signal to the operator.

3. The system of claim 2 wherein the intensity of the warning signal increases as the determined position of the sensor moves closer to the danger zone.

4. The system of claim 1 wherein the processor compares the determined position of the sensor with a predetermined warning zone and is operable to send a signal to the actuator that slows or stops the operation of the machine.

5. The system of claim 1 wherein the processor compares the determined position of the sensor with a predetermined zone of operation for the machine and is operable to send a deactivating signal to the actuator when the determined position is outside the zone of operation.

6. The system of claim 1 wherein at least one sensor is attached to an article of clothing worn by the operator.

7. The system of claim 1 wherein the predetermined danger zone is calibrated.

8. A method of controlling the operation of a machine by an operator, comprising the steps of:
   mounting a transmitter to a machine;
   attaching a sensor to an operator;
   transmitting sensed information from the sensor to a tracking device;
   determining the position of the sensor based on the transmitted information;
   comparing the determined position of the sensor with a predetermined danger zone; and
   transmitting a deactivating signal to the machine when the determined position is within the danger zone.

9. The method of claim 8 further comprising the step of calibrating the danger zone.

10. The method of claim 8 further comprising the step of comparing the determined position of the sensor with at least one predetermined warning zone and sending a warning signal to the operator when the sensor is within the warning zone.

11. The method of claim 10 wherein the intensity of the warning signal increases as the determined position of the sensor moves closer to the danger zone.

12. The method of claim 8 further comprising the steps of comparing the determined position with a predetermined warning zone and sending a signal to the actuator to slow the operation of the machine.

13. The method of claim 8 further comprising the step of sending a deactivating signal to the actuator when the determined position of the sensor is outside a zone of operation.

14. The method of claim 8 wherein the sensor is attached to an article of clothing worn by the operator.

* * * * *